Nov. 11, 1941.   H. P. BROWN   2,261,953
APPARATUS FOR TAKING PICTURES
Filed Sept. 7, 1937   3 Sheets-Sheet 1

Inventor
Harold Palmer Brown.
by Parker & Carter
attorneys.

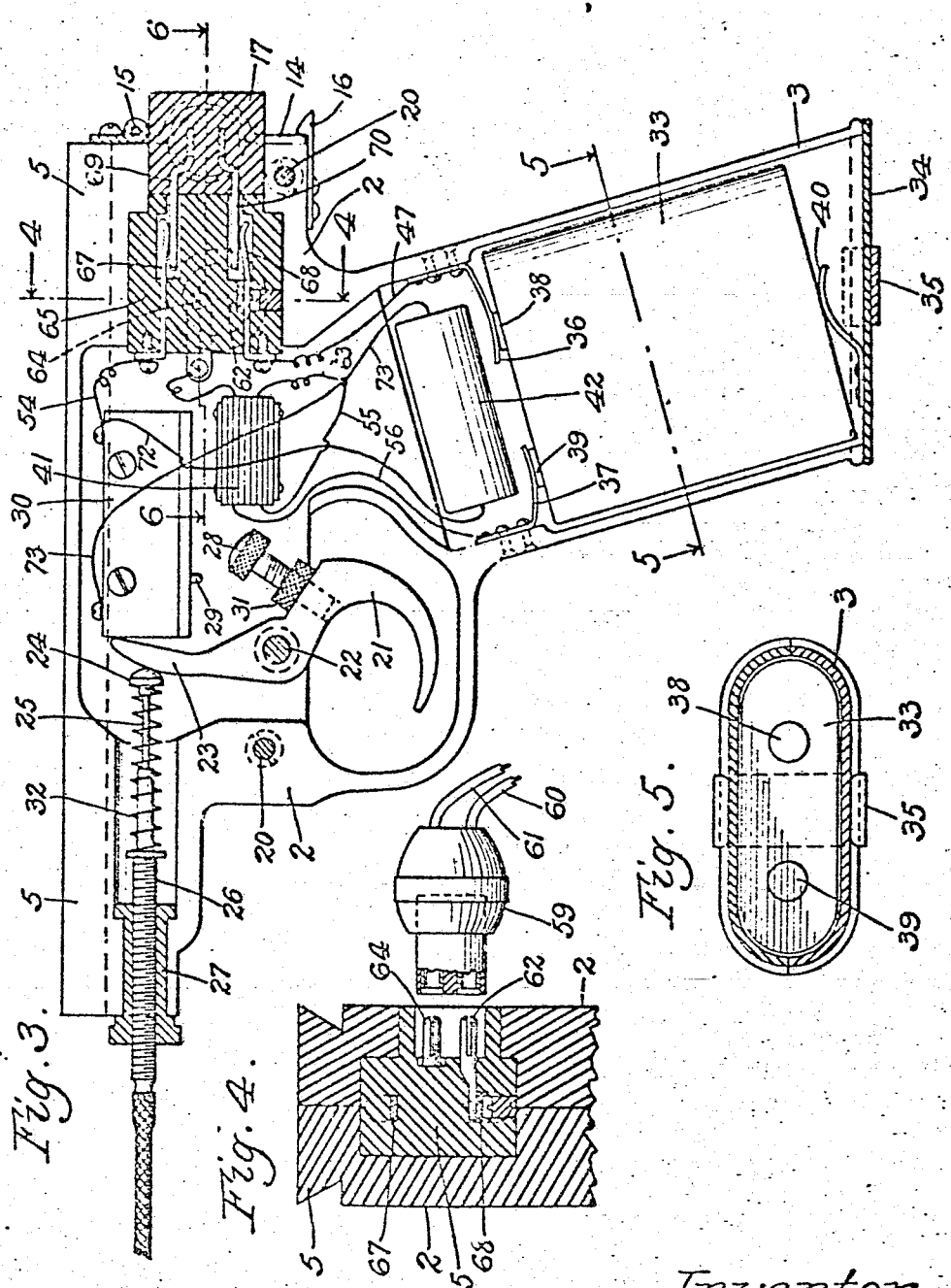

Nov. 11, 1941.     H. P. BROWN     2,261,953

APPARATUS FOR TAKING PICTURES

Filed Sept. 7, 1937     3 Sheets-Sheet 3

Inventor
Harold Palmer Brown.
by Parker & Carter
Attorneys.

Patented Nov. 11, 1941

2,261,953

UNITED STATES PATENT OFFICE 2,261,953

APPARATUS FOR TAKING PICTURES

Harold Palmer Brown, Chicago, Ill.

Application September 7, 1937, Serial No. 162,647

7 Claims. (Cl. 67—29)

This invention relates to an apparatus for taking pictures and has for its object to provide a new process and apparatus of this description.

The invention has as a further object the process and apparatus of taking instantaneous flash light pictures by synchronizing the movement of the shutter of the camera with the operation of the flash light.

The invention has as a further object to provide efficient means for supporting a camera and pointing it at the object to be photographed.

The invention has as a further object to provide efficient means for supporting a camera and pointing it at the object to be photographed and supporting a flash light all in a self-contained unit.

The invention has for a further object to provide a support for a camera and a flash light with means associated therewith to simultaneously actuate the flash light and the shutter of the camera.

The invention has as a further object to provide such a device wherein a single moving part in position to be moved by the finger actuates the flash light and the shutter of the camera.

The invention has as a further object to provide a device of this description which can be operated by one hand to take flash light pictures.

The invention has a further object to make available in the same unit two kinds of current, one to operate a foil or wire mesh flash lamp and the other a filament photoflood lamp.

The invention has further objects which are more particularly pointed out in the following description.

Referring now to the drawings,

Fig. 3 is an enlarged interior view in part section of the camera supporting device separate from the camera and flash light;

Fig. 4 is an enlarged sectional view taken on the line 4—4 of Fig. 3;

Fig. 5 is a sectional view taken on the line 5—5 of Fig. 3;

Like numerals refer to like parts throughout the several figures.

Figure 1:
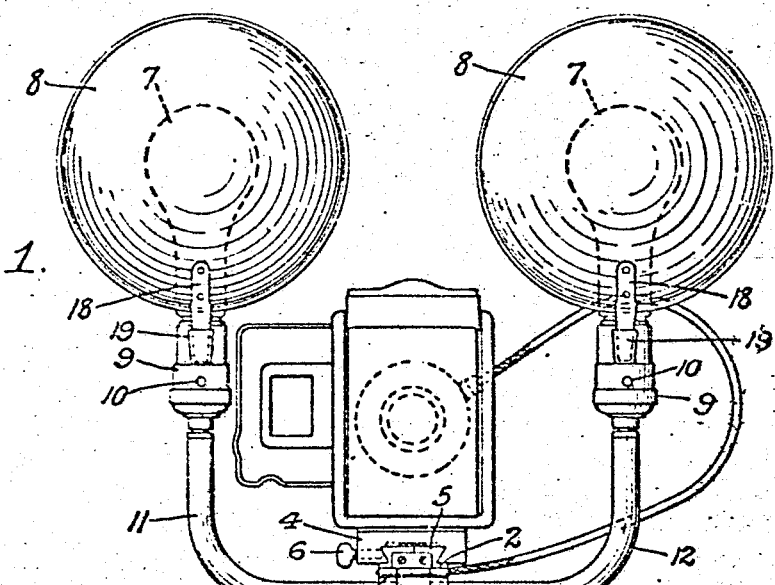
Fig. 1 is a rear elevation of one form of the device for carrying the invention into practice.

Referring now to the drawings, wherein I have shown one form of the device embodying the invention, there is illustrated a camera of any suitable construction and make. Connected with this camera is a supporting device 2 formed in the shape of a pistol having the handle 3 adapted to be gripped with one hand. The support 2 may be attached to the camera in any desired manner. I prefer to have it removably attached to the camera in any desired manner. In the construction shown there is attached to the camera an attaching member 4 having a dovetailed groove therein. The supporting device 2 is provided with a dovetail projection 5 which fits into the dovetailed groove. In assembling the parts, the end of the projection 5 is inserted in the dovetailed groove and moved therealong until the camera is properly positioned. The thumb screw 6 is then tightened to hold the parts in position.

Figure 2:
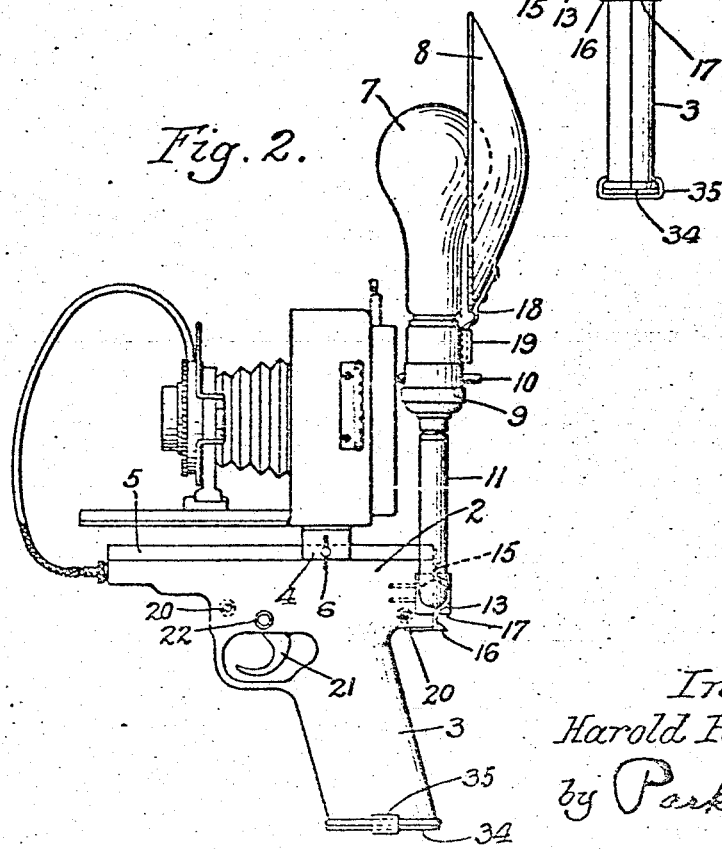
Fig. 2 is a side elevation of the device shown in Fig. 1.

One or more flash lights 7, preferably provided with reflectors 8, are supported upon the support 2 in any suitable manner. As shown, the lights are provided with sockets 9 having switches 10, the sockets being connected to supporting members 11, 12 which are attached to the supporting device 2 in any desired manner. As shown, these supports are hollow to contain the conductors and when two flash lights are used are preferably connected together to form a U-shaped support which is attached to the supporting device 2 by the releasable clamps 13, 14 provided with the pivots 15. The lower ends of these clamps are engaged and held in position by the spring catch 16 (see Figure 2) when the parts are in position. The supporting members 11 and 12 are preferably separate and are connected together in any desired manner as by the connecting piece 17 so that either one or both of the lights may be used.

The reflectors 8 are provided with tapered members 18 which fit into tapered sockets 19. The supporting device 2 is preferably made in two halves or pieces which are connected together by the fastening devices or screws 20. These pieces are hollowed out to receive the electrical mechanism and conductors for controlling and lighting the lights.

A movable controlling member 21 in the form of a trigger is pivotally mounted on the support 2 as at 22. The movement of this member 21 simultaneously actuates the shutter of the camera and closes the circuit through the flash lights. In the construction shown the trigger 21 has a shutter control member 23 which is engaged by the end 24 of the shutter actuating member. As herein shown, the end 24 is rounded and is connected to the cable plunger 25 which slides in a sheath 26 which is adjustably mounted in the fixed member 27 carried by the front end or muzzle of the supporting device 2. This provides for adjusting the shutter actuating device to adapt the mechanism to different cameras. As the trigger is moved back by the finger, the part 23 moves forward moving the end 24 and the plunger 25 through its sheath. This movement of the plunger causes the shutter of the camera to be actuated in the usual manner so as to open it.

At the same time the circuit controlling member 28 on the trigger engages the switch member 29 of the micro-switch 30 so as to close the circuit that actuates the flash light. These parts are adjusted so that the shutter of the camera and the flash light are actuated simultaneously. The circuit controlling member 28 is arranged so as to be adjustable in order to properly adjust the parts to insure the simultaneous actuation of the flash light and the shutter. In the particular structure shown this is accomplished by having the circuit controlling member 28 adjustably connected with the trigger as by a screw-threaded connection. When the proper adjustment is made the switch actuating member is held in its adjustable position by the lock nut 31.

When the trigger is released the parts are automatically returned to their initial position by any desirable means, as for example the spring 32. This releases the circuit controlling member 28 from the switch member 29 and breaks the circuit through the flash light. Any suitable circuit arrangement may be utilized and the parts are all preferably located in the supporting device 2.

The device is so arranged that the flash light or lights may be actuated from a battery or from an outside current. The significant point in making available either battery or house current is that the battery functions only with a magnesium foil or wire mesh flash or "photoflash" bulb. By making it possible to connect my device with the commercial current I make it possible to use a filament bulb known as a "photoflood." This bulb may be used over and over again as it has a minimum life of five hours, whereas the magnesium or wire mesh flash is good for only one exposure and is exhausted.

When actuated from a battery I provide in the supporting device 2 a battery 33 which as shown is located in the handle of the supporting device 2. The supporting device 2 is provided with a removable member 34 which can be removed so that the battery can be inserted. This removable member is held in position by the clip 35 or by any other suitable means. Within the supporting device are the spring contacts 36, 37 which engage the poles 38 and 39 of the battery. I prefer to provide an additional spring 40 which tends to keep the battery pressed into contact with the contacts 36 and 37. The battery is connected with the flash light through the single pole double throw switch 41 and the micro-switch 30 in any desirable manner. There is also provided a condenser 42 associated with the circuit to protect contacts in micro-switch from freezing.

Figure 8:
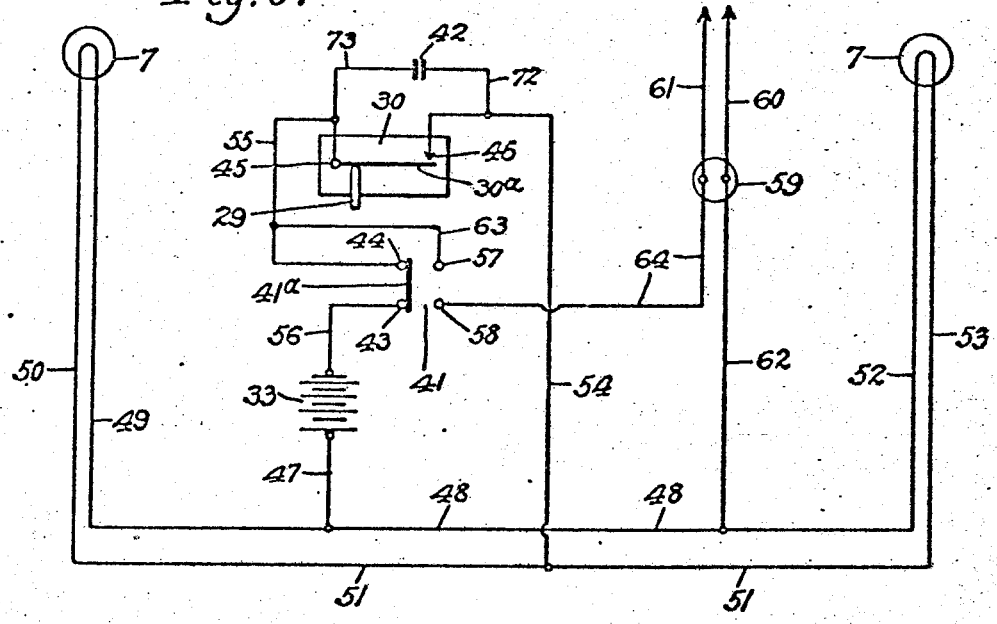
Fig. 8 is a diagrammatic view showing the electric circuits.

I have shown diagrammatically one arrangement of the electric circuit and switches in Figure 8. This circuit shows the circuits both when the battery is used without the outside current and when the outside current is used without the battery. When the battery is used the switch member 41a of the switch 41 is in the position shown in full line in Figure 8 so as to connect the contacts 43 and 44. When the trigger is actuated to move the circuit controlling member 28 so that it moves the switch member 29, this switch member moves the contacting member 30a so as to connect contacts 45 and 46.

The circuit from the battery is then traced as follows. From the battery 33 by conductor 47 to conductor 48 where it divides, one portion going by conductor 49 to one of the lights 7, thence by conductor 50 to conductor 51. The other portion of the current passes to the other light through conductor 48 and conductor 52 and then passes from the light by conductor 53 back to conductor 51. The current from conductor 51 passes through conductor 54 to contact 46, thence through contacting member 30a to contact 45 and thence by conductor 55 to contact 44, thence through the switch member 41a to contact 43 and thence by conductor 56 back to the battery. This causes the current to pass through the two flash lights and actuate them. It will be seen that if only one flash light is used the current will pass through such flash light and actuate it.

If it is desired to actuate the flash lights by an outside current instead of the battery, the switch member 41a is moved to connect contacts 57 and 58 and any suitable plug 59 which is connected to the outside current through the conductors 60 and 61 is plugged into the supporting device 2, see Fig. 4. The battery is now disconnected and the circuits will be traced the same with this difference, that the outside current passes through the conductor 60 and the plug 59 and thence by conductor 62 to the conductor 48 and then through the lamps and by conductors 50, 53 and conductor 51 to conductor 54 and through the switch 30 and conductor 55 and thence by conductor 63 to contact 57 and switch member 41a to contact 58 and thence by conductor 64 back to plug 59 and conductor 61 to the source of current supply.

It will thus be seen that by simply pulling the trigger the flash light may be lighted and at the same time the shutter of the camera will be opened to permit light from the flash light to enter the camera to produce a photographic image on the film. In the particular construction illustrated in the drawings, the lamps are arranged so that they may be easily removed or attached to the camera and so that either the battery or an outside current may be used. The lamps are also arranged so that they can be easily removed from the supporting device 2. For this purpose the supporting device is provided with the two members 65 and 17, see Fig. 3. The member 65 is provided with the contacts 67 and 68 and the member 17 is provided with the contacts 69 and 70 which engage the contacts 67 and 68. The member 17 has also attached to it the members 11 and 12 and the flash lights.

Figure 6:
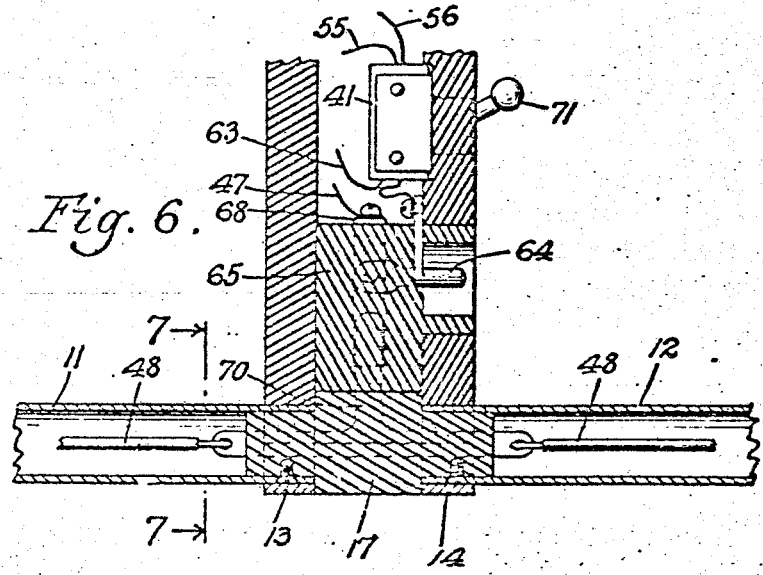
Fig. 6 is an enlarged sectional view taken on the line 6—6 of Fig. 3.
Figure 7:
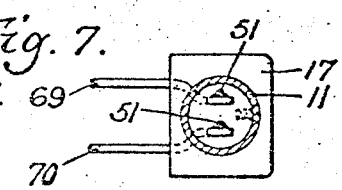
Fig. 7 is a detail view of the flash light supporting member, with parts in section, on the line 7—7 of Fig. 6.

The flash lights are attached to the supporting device 2 by inserting the contacts 69 and 70 into the openings in the member 65 to bring the contacts 67 and 69 into contact and the contacts 68 and 70 into contact, and the parts are held in position by the pivoted members 13, 14 which in turn are held in position by the spring latch 16. When it is desired to connect the flash lights with the outside source of current supply and disconnect them from the battery, the plug 53, as heretofore set out, is pushed into its socket so as to connect the conductors 60 and 61 with the contacts 52 and 54 and the switch member 41a is moved out of contact with the contacts 44 and 43, and into contact with the contacts 57 and 58 by means of the control handle 11, see Fig. 6. The condenser 42 is connected in the circuit, see Fig. 8, by the conductor 72 connecting with conductor 54 and the conductor 73 connecting with the contact 45.

If it is desired to use the supporting device only for pointing and operating the camera shutter, the electrical apparatus may be omitted, in which event it is only necessary to grasp the handle of the supporting device 2, point the camera at the object to be photographed and when it is in proper position, to pull the trigger 21, whereupon the shutter will be actuated and the photograph taken.

It will further be seen that this device has very great versatility which gives it a wide market because of the economy produced without in any manner sacrificing efficiency.

I claim:

1. A photographic apparatus comprising a camera, a flash light, a supporting device for the flash light located under the camera, means for attaching the supporting device and the flash light to the camera, a handle forming a part of the supporting device for use in pointing the camera at the object to be photographed, said flash light supporting device being separate from said handle and removably connected therewith, said handle forming a hollow pistol grip, a trigger separate from the camera and connected with said pistol grip, a connection to the shutter of the camera actuated by the movement of the trigger, a switch in said hollow pistol grip, said connection to the shutter of the camera and said switch simultaneously actuated by the movement of the trigger to close a circuit through the flash light, and a battery located in the hollow pistol grip and connected in circuit with said switch and flash light.

2. A photographic apparatus comprising a camera, a supporting device therefor attached to the bottom of the camera, a pistol grip handle attached to said supporting device for use in pointing the camera, a flash light connected with said supporting device, and mechanism carried by said supporting device for simultaneously actuating said flash light and the shutter of the camera comprising a trigger pivotally mounted on the interior of said handle and having one end projecting therefrom, an actuating device for the shutter of the camera having one end projecting into said handle, a switch on the interior of said handle, for actuating the flash light, said trigger having two separated parts projecting on the interior of the handle, one of said parts actuating the shutter of the camera when the trigger is pulled, and the other part actuating the switch for actuating the flash light, said latter part being adjustable.

3. A photographic apparatus comprising a camera, a supporting device therefor, a flash light bulb in proximity to said camera, a connecting member connected to the camera intermediate the camera and the supporting device, and a dovetailed connection between the connecting member on the camera and the supporting device, by means of which the supporting device may be readily connected to or disconnected from the camera, said supporting device being hollow and having therein the electrical connections and circuit controlling means for connecting the flash light bulb with a source of electric supply for lighting the flash light bulb.

4. A photographic apparatus comprising a camera, a supporting device therefor, a flash light bulb, a connecting member connected to the camera intermediate the camera and the supporting device, a dovetailed connection between the connecting member on the camera and the supporting device, by means of which the supporting device may be readily connected to or disconnected from the camera, said supporting device being hollow and having therein the source of electric supply for lighting the flash light bulb, a support for said flash light bulb removably connected with the camera supporting device, circuit connections on said support which connect the flash light bulb with said source of electric supply in the supporting device for the camera, by the mere attachment of said support with the supporting device for the camera.

5. A photographic apparatus comprising a camera, a flash light, a supporting device for the flash light located under the camera, means for attaching the supporting device and the flash light to the camera, a handle forming a part of the supporting device for use in pointing the camera at the object to be photographed, said flash light supporting device being separate from said handle and removably connected therewith, said handle forming a hollow pistol grip, a trigger separate from the camera and connected with said pistol grip, a connection to the shutter of the camera actuated by the movement of the trigger, a switch in the hollow pistol grip, means in said hollow pistol grip for making a connection to a source of current supply, and circuit connections in the hollow pistol grip, said connection to the shutter of the camera and said switch simultaneously actuated by the movement of the trigger to close a circuit through the flash light and open said shutter.

6. A photographic apparatus comprising a camera, a support therefor, a battery connected with said camera, a support for said battery, two flash light bulbs, a support therefor connected with said camera and having laterally extending arms with upturned ends on opposite sides of said camera, a flash light bulb being connected with each of said upturned ends, and means for electrically connecting said flash light bulbs with said battery or with an outside source of current supply, the support for said camera, battery and the flash light bulbs having a single handle so that they are all held in position by one hand.

7. A photographic apparatus comprising a camera having a shutter, a pointing device comprising a hollow pistol grip handle attached to the camera, a flash light connected with said handle, a trigger connected with said handle, a plunger for tripping the camera shutter, a part connected with said trigger for directly engaging and moving said plunger, an electrical contact connected with said trigger, and a stationary electrical contact in proximity thereto, the two contacts connected with electric circuits located in the pistol grip handle and with said flash light, the two contacts engaging when the trigger has been moved sufficiently to open the camera shutter so as to simultaneously light the flash light and open said shutter.

HAROLD PALMER BROWN.